R. E. EGGLESTON.
APPARATUS FOR PRODUCING TAPE, STRING, AND THE LIKE.
APPLICATION FILED DEC. 9, 1912.

1,132,837.

Patented Mar. 23, 1915.

R. E. EGGLESTON.
APPARATUS FOR PRODUCING TAPE, STRING, AND THE LIKE.
APPLICATION FILED DEC. 9, 1912.

1,132,837.

Patented Mar. 23, 1915.
6 SHEETS—SHEET 4.

R. E. EGGLESTON.
APPARATUS FOR PRODUCING TAPE, STRING, AND THE LIKE.
APPLICATION FILED DEC. 9, 1912.

1,132,837.

Patented Mar. 23, 1915.
6 SHEETS—SHEET 5.

R. E. EGGLESTON.
APPARATUS FOR PRODUCING TAPE, STRING, AND THE LIKE.
APPLICATION FILED DEC. 9, 1912.

1,132,837.

Patented Mar. 23, 1915.
6 SHEETS—SHEET 6.

UNITED STATES PATENT OFFICE.

RUFUS E. EGGLESTON, OF ATLANTA, GEORGIA, ASSIGNOR TO NATIONAL TAPE COMPANY, INC., OF NEW YORK, N. Y., A CORPORATION OF NEW YORK.

APPARATUS FOR PRODUCING TAPE, STRING, AND THE LIKE.

1,132,837.     Specification of Letters Patent.     Patented Mar. 23, 1915.

Application filed December 9, 1912. Serial No. 735,747.

*To all whom it may concern:*

Be it known that I, RUFUS E. EGGLESTON, a citizen of the United States, residing at Atlanta, in the county of Fulton and State of Georgia, have invented certain new and useful Improvements in Apparatus for Producing Tape, String, and the like, of which the following is a specification, reference being had therein to the accompanying drawing.

This invention relates to apparatus for producing tape, string and the like.

The object of the invention is to present apparatus of simple and effective construction for manufacturing tape and the like in relatively large quantity, the finished product thereof being tape or the like composed of a plurality of threads or strands lying side by side and held together by an effective adhesive substance.

I am aware that it is broadly old to make tape composed solely of longitudinal threads or strands laid side by side and held together solely by an adhesive material and, therefore, I do not assert invention of such a product nor of a machine for making the same wherein the means for laying said threads side by side is disposed remotely from a position where the adhesive material is applied to the threads or strands. On the contrary, I disclaim such a form of machine.

What I do assert as of my invention is apparatus wherein the instrumentality or instrumentalities for effecting a tendency of the threads or strands to move toward and into intimate contact with each other shall be immediately at or in close relation to the position where the adhesive substance is applied to the threads. In point of fact, as well as a matter of structure, this arrangement is radically different from what has heretofore been proposed and, so far as I am aware, is broadly new. Advantages and results of importance and merit flow from this difference in arrangement and these will more particularly appear hereinafter.

My invention, in one aspect, resides in the method of producing tape from a plurality of threads or strands by effecting their movement toward and into contact with one another in juxtaposition to the point where the adhesive substance is applied, whereby such threads or strands are caused to adhere and effect an intimate contact with one another before the adhesive substance shall have had an opportunity to dry or "set."

My invention, in another aspect, resides in novel apparatus for practising this method, the construction and details of which apparatus will be explained hereinafter.

Obviously, my invention permits the utilization of a great variety of instrumentalities for producing the desired results, and it will, therefore, be understood that, by disclosing herein certain particular forms of structure, I confine myself thereto and to the operation thereby performed only in so far as they carry into effect the principles of my invention, it being remembered, always, that it is the desideratum of my sense-concept to arrange certain of the instrumentalities of the apparatus in such relation that their functions are performed almost if not entirely simultaneously, as differentiated from known modes of operations wherein there is a distinct period of time wherein the materials are subjected to one or more actions intermediate their being brought into contact and the application thereto of the adhesive substance.

In the accompanying drawings, I have illustrated some of the various embodiments of my invention and which have to a greater or less degree the attributes I assert for my novel method and apparatus for producing tape and the like from threads or strands so that, in the final product, they lie approximately parallel to one another and are intimately held together by a substance that does not affect the flexible characteristics of tape, string, and the like.

In these drawings: Fig. 12 is also a fragmentary view, in front elevation, and particularly in section, of another modified form of structure, the same, in this instance, contemplating the omission of solution-supplying tanks and the substitution therefor of a solution-supplying pipe provided with nozzles or the like.

Referring to the drawings, and to the embodiment illustrated in Figs. 1 to 10, inclusive, the numeral 1 designates a base or flooring upon which certain of the instrumentalities of my apparatus are adapted to be supported; 2 designates an overlying ceiling or the like, from which certain operating parts of the apparatus are suspended. At one side of the room 3 formed between the base 1 and ceiling 2, is a structure, which may generally be designated by the numeral 4, for producing, and maintaining at the proper consistency, a suitable adhesive solution. As this structure may be of any appropriate form, and as it, in its details, forms no part of my invention, I deem it unnecessary to describe the same at length. It will suffice to say that, to produce the best results a circulation of the adhesive substance from said structure to the point of use is desirable; and, to this end, a pipe 5 leads from a storage-tank 6—forming a part of said structure—to a solution-supplying and tape-forming tank 7, there being means, such as a valve 8, for controlling the flow of the solution. A return-pipe 9 leads from the pipe 5 back to a receptacle 10, also forming a part of the structure 4. It will be understood that, should it be necessary to cut off the supply of the solution to the tank 7 at any time, and yet, at the same time, not to interrupt the circulation of the solution, the valve 8 is closed, whereupon the solution will flow back through the pipe 9 into the receptacle 10. If the valve 8 is open, the solution passes into the tank 7 and is led therefrom, by a pipe 11, back to the structure 4, where it may be re-heated or stored, as may be desired. If it be desirable to empty the tank 6, this can be done by providing a pipe, not shown, leading therefrom to a source of discharge.

Figures 3, 5, 6, 10:
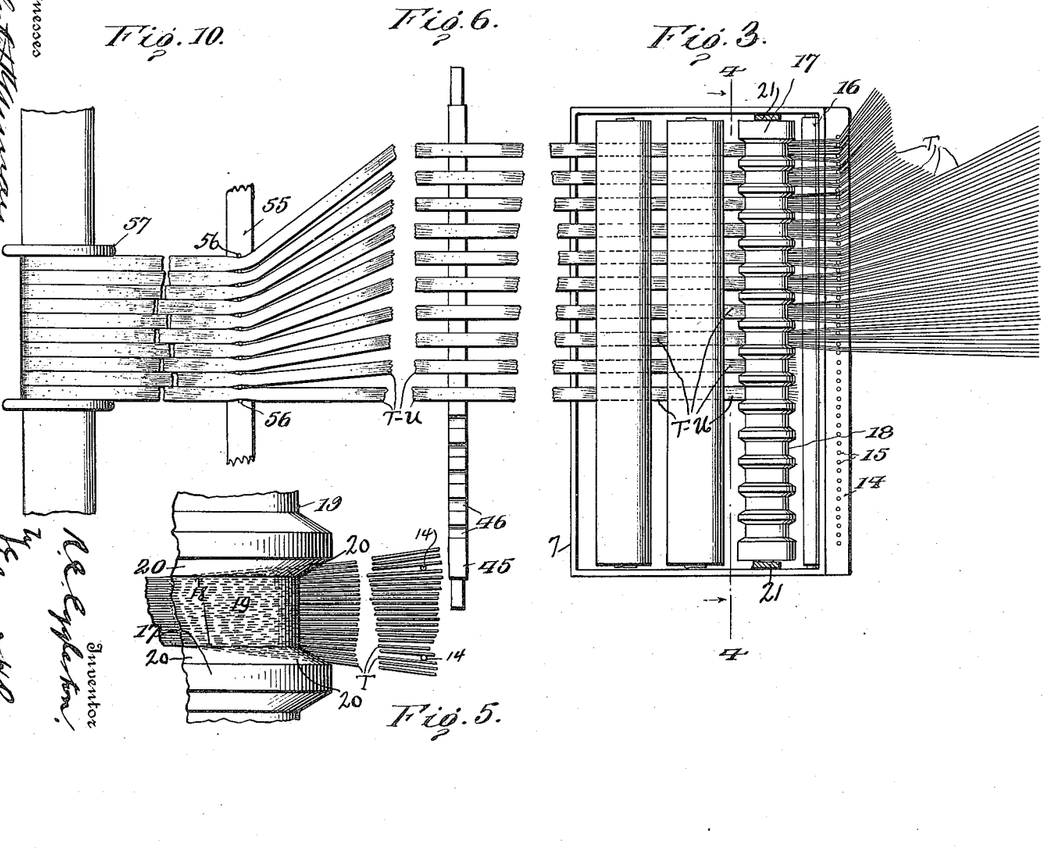
Fig. 3 is a similar view, in detail, of the solution-supplying and tape-forming tank in which are performed the two operations (practically simultaneously) of laying the threads side by side and applying thereto the adhesive substance.
Fig. 5 is a fragmentary view, in top plan, and on an enlarged scale, of the instrumentality for positioning the several threads or strands side by side so that their surfaces will adhere as the adhesive substance is applied thereto.
Fig. 6 is a fragmentary view, in top plan and on an enlarged scale, of a tape-engaging bar over which the tapes are passed after passing out of the solution-applying and tape-forming tank, and the function of which bar is to subject the tapes to an action tending to force the threads into more intimate relation, etc.
Fig. 10 is a fragmentary view, in top plan, of portions of the tape-spooling parts of the apparatus.

Arranged in juxtaposition to the tank 7, is a suitable support 12 upon which is mounted a plurality of thread-holding creels 13, there being, in this instance, four, two of which are arranged in a plane somewhat above that of the other two as a matter of convenience and for a desirable way of feeding thread or strands T wound thereon. The detail construction of these creels or thread-supporting members forms no part of my invention and, therefore, detailed explanation is unnecessary. It will suffice to say that they are of such capacity as to hold, preferably, a suitable supply of threads or strands, and these may be all of one color, or of different colors, according to the coloring which is to be embodied in the tape produced by the apparatus presently to be described. Disposed between said creels and the tank 7, is a suitable comb or pin-provided bar 14 which, preferably, may be mounted upon the tank 7, as shown. This comb preferably consists of a bar provided with a plurality of equidistantly-spaced and alined pins or posts 15 upstanding from said bar sufficiently to constitute guides for the threads. Any suitable number of threads may be utilized to form the tape-product produced by the apparatus herein revealed: but, as shown in Fig. 3, I prefer to feed a predetermined number of these threads into the tank and between any two of said pins. Arranged in parallelism with the bar and preferably in close proximity thereto is a roll or curved bar 16 which, if it be a roller, can be suitably journaled at the ends of the tank to permit its rotation and, thus, facilitate the feeding of the threads or strands from the creels into the tank. The tank 7 may be of any desirable form and dimensions: I prefer, however, that it shall be of such depth as to permit the disposition within the same of several instrumentalities (now to be described) that are adapted to engage the threads and perform certain defined functions in connection therewith.

Figure 15:
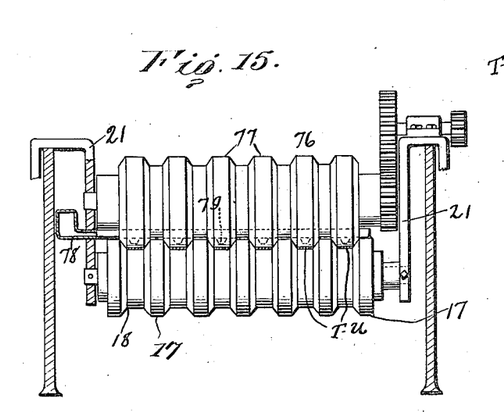
Figs. 15, 16 and 17 are views, respectively, in sectional elevation, perspective, and vertical section of still another modified form of structure contemplating the omission of a solution-supplying tank and the provision of a single means for effecting movement of the threads or strands and the positioning of these side by side and the intimate contacting of their surfaces.

It is obvious that means must be provided for positioning the threads or strands so that they shall be arranged with their surfaces in intimate contact with each other—side by side if the product is to be in the form of tape—and, to this end, and as one of the features of my invention, I prefer to arrange such means at a point where the same will act upon the thread to perform its function at or about the time that the solution is applied thereto, in order that these two functions—the application of the solution and the bringing together of the threads—may be effected approximately simultaneously, or in close sequence, to produce the best results: Any appropriate thread-positioning instrumentality may be employed; but, in practising the invention, I have found that a grooved member or roller 17 submerged, or partly submerged, in the solution, is very effectual to produce the desired results. The form and manner of mounting this thread-positioning roll may be clearly seen in Figs. 3, 4 and 15: Preferably, and as shown, this member 17 is provided with a series of grooves 18 formed by an approximately flat thread-engaging surface 19 and with inclined side-walls 20. If the member 17 be in the form of a roller—and this form has advantages in that it is possible to present to the thread a different surface from time to time, in case of wear—the grooves 18 would preferably extend entirely around the same, though this is not essential, so long as the effective portion of the rolls is grooved, as described. Manifestly, the member may be provided with numerous grooves, and the capacity of the machine to produce threads will be governed only by the number of the grooves thus provided.

The member 17 may be arranged to rotate, and means may be provided, if required, to rotate said member. As a result of practical use of the machine, however, I find it desirable to hold the roller against rotation while performing its function of positioning the threads or strands side by side, wherefore I prefer to employ it as a normally non-rotatable member. I do not, however, restrict myself in this particular. The member 17 may be supported within the tank in any desirable manner, and means may be provided for thus supporting the roll in a manner that will permit it to be turned from time to time to present to the thread a new surface, whereby wear on any particular portion of the surface may be prevented; or, if such wear does occur, a new and unworn surface may be provided: As a means of supporting the roll in a manner that will permit its positioning at any desired depth within the solution, or out of it, I prefer to provide hangers 21 in which the rolls 17 may be journaled. The hangers may be formed with racks 22 adapted to be engaged by pinions 23, journaled on stub-shafts 24 disposed in brackets 25 mounted on the side of the tank, and one of which pinions may carry a crank 26 by which the pinion may be rotated and thereby raise the hangers and, in consequence, elevate the rolls 17: By this means, the roll may be disposed at any particular height from the bottom of the tank desired; and, whenever necessary, said roll may be raised to the top of the tank to clean the same or to permit it to be maintained out of the solution whenever this may be necessary. At this point, it may be stated that, in operation of this apparatus, it is desirable to remove the contents from the tank, as at night, so that a fresh solution may be introduced thereinto, as in the morning. The roll 17, being of considerable weight, cannot be handled readily without some mechanism for positioning it; and, while any appropriate means for thus positioning it may be provided, I have found that that herein disclosed possesses advantages.

Figures 4, 7, 8, 9:
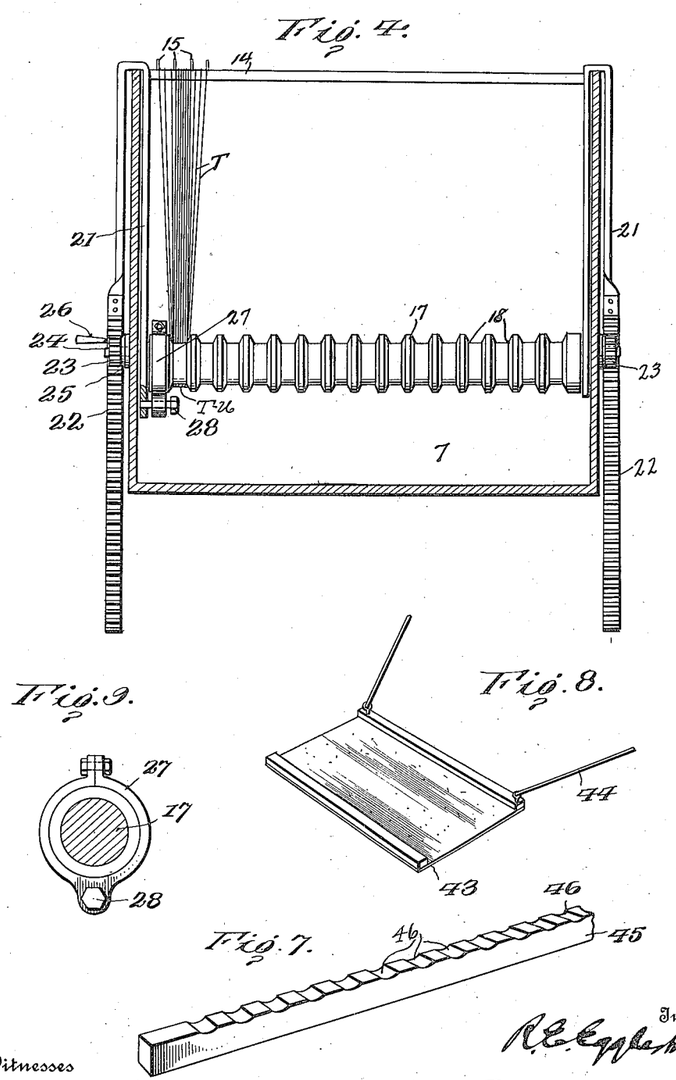
Fig. 4 is a view in vertical section, on the line 4—4, Fig. 3, looking in the direction of the arrows.
Fig. 7 is a fragmentary view, in perspective, of the bar.
Fig. 8 is a detached view, in perspective, of a drag-element disposed in the path of travel of the tape and located, in this instance, between the tank and tape-engaging bar.
Fig. 9 is a detail view of a roller-clamping device adapted to be mounted at one end of the tape-forming roll, and which also appears in Fig. 4, in side elevation.

I have already referred to the fact that means may be provided to prevent any turning of the roll 17, except as may be found necessary: Any suitable roll-holding device may be utilized; but a convenient form thereof is illustrated in Fig. 4 and in detail in Fig. 9; and in these instances, the same is shown as including a clamp 27 adapted to embrace the bearing-end of the roller, and which clamp may, as shown, be provided with a screw or headed member 28 adapted to be supported in the lower end of the hanger 21 and form the connection between one end of the roll and said hanger, as clearly shown in Fig. 4. Preferably and as shown, the member 17 occupies a position considerably below the plane of the comb 14 and member 16 so that, assuming that the quantity of the solution within the tank is such that the tape-forming roll 17 is wholly or partially submerged, the threads or strands, after passing over the comb 14, move downwardly into the solution and around the lower portion of the roll 17. Between the comb and the solution, the threads will, of course, be separated; but, as they come into contact with the cylindric and inclined surfaces 19 and 20, respectively, of the grooves 18, they will be caused to move toward and against each other and, thus, into intimate contact with one another: The threads which more nearly aline with the cylindric surfaces 19 will, of course, be forced toward each other by those threads which aline with the inclined surfaces, the inclination of which must be such as to tend to cause the threads to have a sliding movement toward the cylindric surfaces 19 so that should the threads pass out beyond a medial line extending through the axis of the roller, all of the threads will have been positioned and engage the cylindric surface 19, from which point the threads, having been laid side by side and having absorbed more or less of the adhesive solution within the tank, pass on their onward travel through other parts of the machine as a tape or ribbon. It will be understood, however, that the action of the surfaces 19 and 20 will have been such as to lay the threads side by side without causing or permitting any of them to override any of the others. It will thus be recognized that the form and position of the member 17 must be such as to accomplish the result just noted, wherefore it follows that the form of the grooves 18 is preferably of a particular character. It will also be understood that only that number of threads should be fed to each groove as can be accommodated on the cylindric surface 19; and the threads must yet be of sufficient number that each will be caused to engage and move the proximate thread in the direction of the cylindric surface 19, whereby the several threads will have been positioned in intimate contact, side by side. The application of the adhesive solution while the tape-forming operation is being effected tends to cause the threads to absorb a desirable amount of the solution so that, when the threads are united as a tape or ribbon, each thread will carry that amount of the solution as will enable it as to permanently adhere to the thread at each side. As will presently be pointed out, it is not essential that the solution shall be supplied to the threads in this particular way, since it is within the spirit of my invention to supply the solution without passing the threads into a solution-containing tank; but such modification will be explained farther on.

The tape having now been formed, in the manner already explained, it is desirable to provide means for pressing or squeezing a certain amount of the solution out of the tape or ribbon in order that the product shall not be stiff or carry too much of the adhesive substance: Any appropriate means may be employed for this purpose and may be disposed at any desirable point; but I have found it preferable to accomplish this function while the tape is still within the tank so that the superfluous solution may pass off into the tank, and in order that the desirable feature may be effected of pressing the tape before the solution has had much if any opportunity to dry: To this end, I provide one or more pairs of pressure-producing rollers 29, each pair thereof being independently driven and being, preferably, arranged in juxtaposition. One pair would suffice; but I prefer to employ two or more pairs. In this instance, the two lower rollers are geared at one end to mesh with a drive-gear 30 which receives motion from a bevel-pinion 31 mounted on the end of a shaft 32, suitably journaled, and which, at its opposite end, carries another bevel-pinion 33 meshing with a bevel-gear 34 fast on the shaft 35 which carries, at its opposite end, a pulley 36 adapted to be driven by a belt 37 which receives motion from a pulley 38 driven by a belt 39 that passes over a pulley 40 connecting, by a belt 41, with a motor 42.

Figure 1:
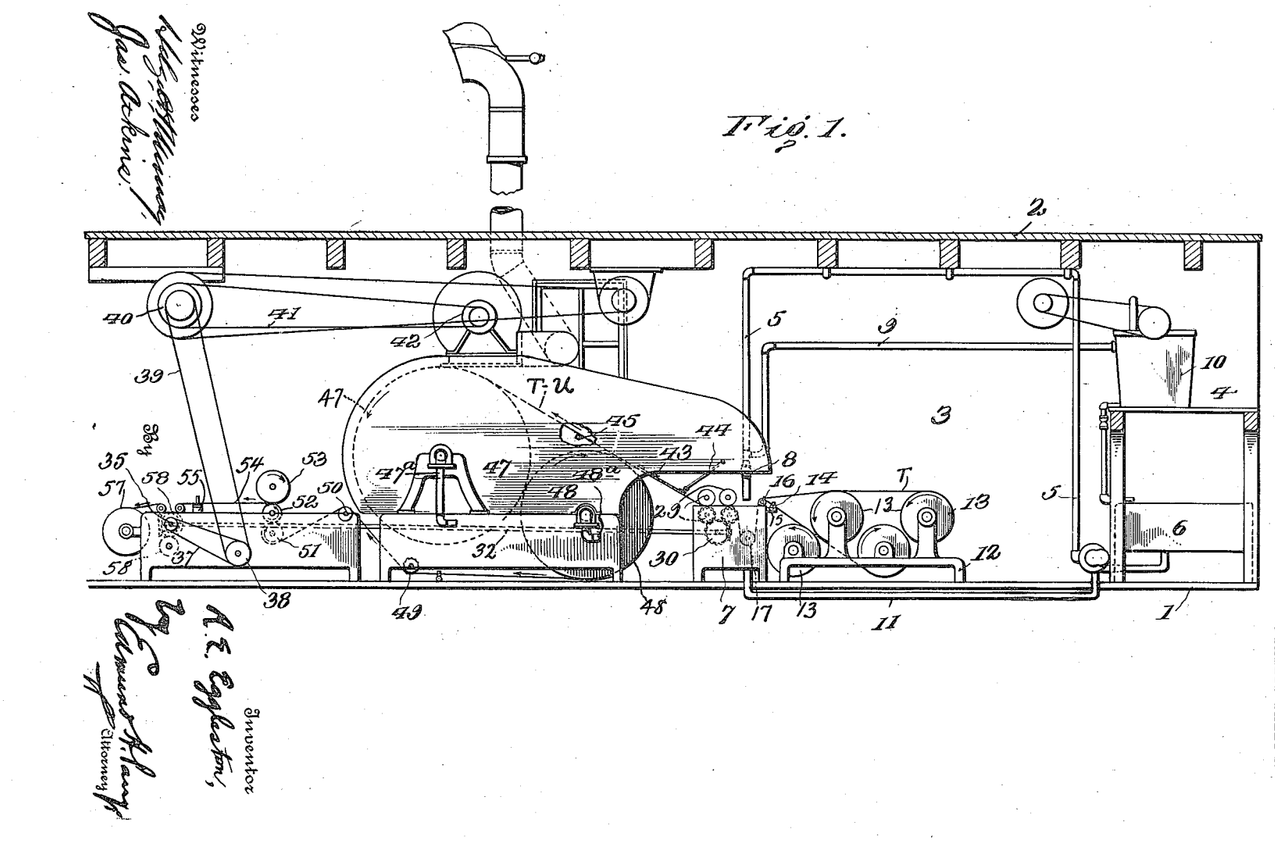
Figure 1 is a view in side elevation (some parts appearing in section) of one form of apparatus constructed in accordance with my invention, and wherein is illustrated instrumentalities for holding and supplying an adhesive substance to the threads fed from a suitable source of supply, and which threads are brought into such relation that, from a certain point in their travel, they move as a unit.
Figure 2:
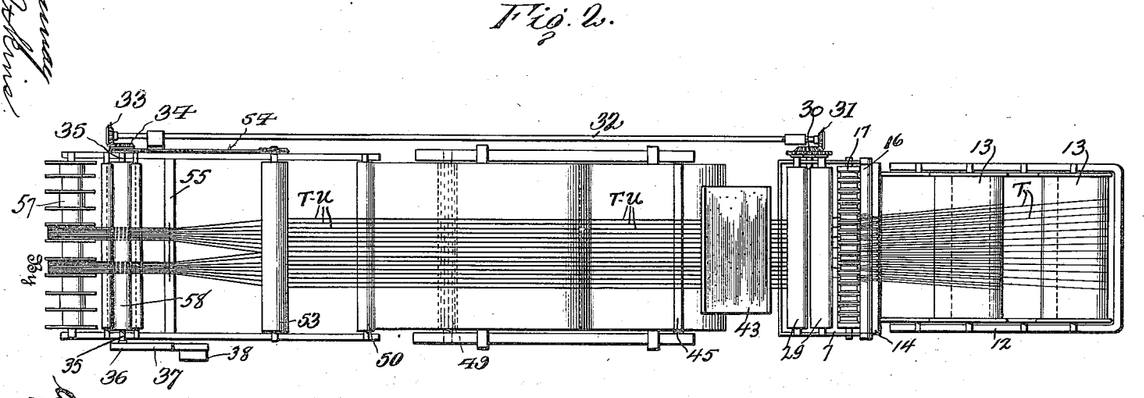
Fig. 2 is a top plan view, illustrating, at the right, the separate threads or strands; then (somewhat toward the left) several groups of the threads united with one another in the form of tape—the machine being shown, also, as having a capacity to produce a large number of tape-units simultaneously; and, finally, toward and at the extreme left, the manner of spooling the tape.

The upper rollers of each pair are preferably ungeared and have motion only as a result of the movement thereagainst of the tape and their underlying companion rollers. Each pair of rollers is adapted to effect sufficient pressure upon the tape as to press out of the same a certain amount of the solution; and, if desirable, such pressure may be predetermined, with means provided to accomplish this, whereby a predetermined quantity of the solution may be removed from the tape. Another and equally important function of the rollers is to press the threads of the tape toward one another in such manner that they will assume an even more intimate contact with the result that the tendency of any separation is reduced to a minimum. These operations will have caused a certain amount of change in the texture of the thread, resulting in the raising somewhat of the nap thereof which it is desirable to eliminate. To this end, the tape is passed beneath a drag 43, so-called, the relative position of which is shown in Figs. 1 and 2, and the particular construction of which is shown in detail in Fig. 8. This device is suspended so that it will rest upon and be supported by the tape passing beneath the same, and which is prevented from traveling with the tape by means of cords 44 attached to any suitable part of the machine. This device includes a moisture-absorbing fabric which, from time to time, may be wet by the operator. This drag device tends to "lay" the nap: By reason of the fact that the tape will, in passing in contact with the drag device, have added to it some moisture, and in order to subject the companion threads of the tape to action which will tend further to cause them firmly to adhere to one another, I provide a cross-bar 45, in juxtaposition to the drag device 43, and provided with grooves 46 which, in this instance, are preferably in the form shown in Fig. 7; that is to say, these grooves are concaved and are of such depth that, by reason of the fact that the tape is being moved in a comparatively taut condition, they tend to force the threads hard against each other, effecting their more intimate union.

The tape will, when it shall have reached the bar 45, be practically completed; but I prefer to subject it to further treatment, including a drying action, a polishing action, and so forth. To this end, after the tape has passed from the bar 45, it is caused to pass around heating-cylinders 47 and 48 which are, by preference, of relatively different diameter, but each of such size that the tape may be in contact therewith for a predetermined period in order that the tape may be dried to a desirable degree. Either live or exhaust steam may be supplied to these cylinders and, to this end, steam-supplying pipes 47ª and 48ª may extend through the trunnions on which the cylinders are supported and connect with any suitable source of steam supply. In thus disclosing this form of drying structure, I do not wish to limit myself to the same, since, as will presently be pointed out, other drying media may be employed. The tape, having passed around the cylinder 48, passes over guide-rollers 49 and 50, the former being, for instance, ribbed, as illustrated in Fig. 2, after which the tapes may be polished by being passed between the polishing and dressing rolls 51, 52 and 53, arranged in about the relation shown in Fig. 1, and one or another of which may be rotated at relatively different speed from the other whereby a polishing action is effected. One or another of these rollers may be driven by a belt 54 receiving motion from a pulley and gearing (not shown) connecting with the gear 34. Having thus been polished and dressed, the tapes pass over a guide-comb or bar 55 provided with upstanding posts or pins 56, equidistantly-spaced but of a distance apart less than the width of the tape or ribbon whereby, as a tape passes between two of the pins, its edges will be raised or curled up somewhat preparatory to the tape passing upon a reel or spool 57. By this means, the edges of the tape are "finished". It is necessary, of course, to provide some means for effecting a movement of the tape through the machine; and while it is manifest that any desirable instrumentalities may be employed for this purpose, yet I find it advantageous to dispose, near the finishing end of the machine, a pair of drawing rolls 58 which receive motion, by belt 37, from the pulley 38, already described. Passing from these drawing or feeding rolls 58, the tapes are spooled; that is to say, are wound upon the reels or spools 57, aforementioned, which are rotated in any desired manner to accomplish this result.

It is to be understood that, when operations are to be initiated in this apparatus, the various threads from the sources of supply, namely, the creels 13, are, by the operator, drawn along over the comb 14, under the tape-forming roll 17—the solution not then having been fed into the tank—between the compression-rollers 29, beneath the drag device 43, over the grooved bar 45, around the heating cylinders 47 and 48, under and over the rollers 49 and 50, between the polishing and dressing rolls 51, 52 and 53, over the comb 55, and around the drawing rolls 58 which, then being set in motion, initiate movement of the threads. Before the drawing rollers are started, however, the required quantity of the adhesive solution is fed into the tank 7, whereupon the forming of the tape begins. When those portions of the threads which were beyond the solution-containing tank 7 have passed beyond the drawing rolls 58, they are cut off so that the tape-units T—U, which have then reached said drawing rolls, may be passed therethrough, whereupon the whole machine is completely in operation and producing tape.

It will be understood and made clear from the drawings that the tape-units, from the time that they are formed by the tape-forming rolls 17 until they reach the comb or cross-bar 55, are separated somewhat and pass through the various parts of the machine in this separated arrangement. By the comb 55, however, they are laid side by side and, when reeled upon the members 57, are in close contact with one another whereby the tape may be wound upon said members 57 in unspaced relation and, thus, be carried onto said members 57 in large volume; after which they may, by any suitable means, be transferred onto small spools, cones, or the like, according to the form in which they are to be marketed. By reason of the fact that the threads are fed to the tape-forming element 17 from separate sources of supply—though a large volume of differently colored threads or strands may be wound upon the several creels 13—it is clear that each tape may be formed of threads of the same color, or threads of different colors to produce stripes.

From the foregoing, it will be seen that the tank 7 constitutes an adhesive solution-holding element; that the drawing rolls 58, with the various guiding instrumentalities disposed between these and the creels 13, constitute means for passing a plurality of threads or strands through this solution contained in the tank; and that the member 17 constitutes a means, disposed within the tank, for laying said threads or strands side by side and for causing their surfaces to adhere to form a tape or ribbon. It will also be seen that, by changing the grooves or surfaces of the forming member 17, with a corresponding change of certain other parts of the machine, it is possible to make the product in the form of string, cord, and the like. It will be equally clear that the strength of the tape may be changed by increasing the size of the threads; likewise, the width of the tape or ribbon may be increased or diminished by changing the width of the effective surfaces of the forming roll 17. Moreover, with the machine constituted as already described, and by supplying two or more layers of threads to the forming rolls 17 simultaneously, a tape or ribbon of greater thickness may be provided. At this point, I wish to make clear that, while those parts of the machine which are provided beyond the compression-rollers 29 are not entirely essential to the production of tape and may be dispensed with and be replaced by other means for treating the tape, or for effecting its movement through the apparatus, I desire to emphasize the fact that it is a salient feature of my invention to effect the positioning of the threads or strands toward and against each other, in intimate contact, simultaneously with or in close sequence to the application of the threads of the adhesive solution. Following this, is the desirable feature of subjecting the tape, then formed, to the compressing action of appropriate instrumentalities; and, then, the drying of the tape.

Figure 11:
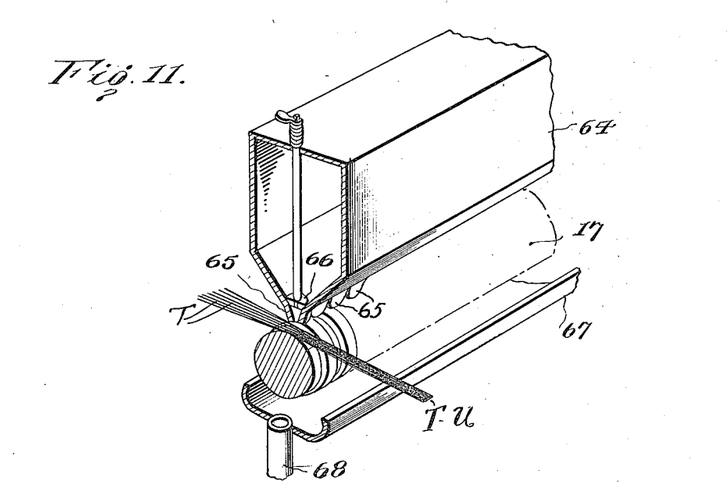
Fig. 11 is a fragmentary view, in perspective, and partially in section, of a somewhat different embodiment of the invention, the same, in this instance, embracing a modification of the instrumentalities in the apparatus for supplying the adhesive substance to the tape-threads as they pass over the tape-forming roller; the apparatus, in this instance, contemplating the omission of an underlying solution-supplying tank, as in the embodiment illustrated in Figs. 1 to 10.
Figure 18:
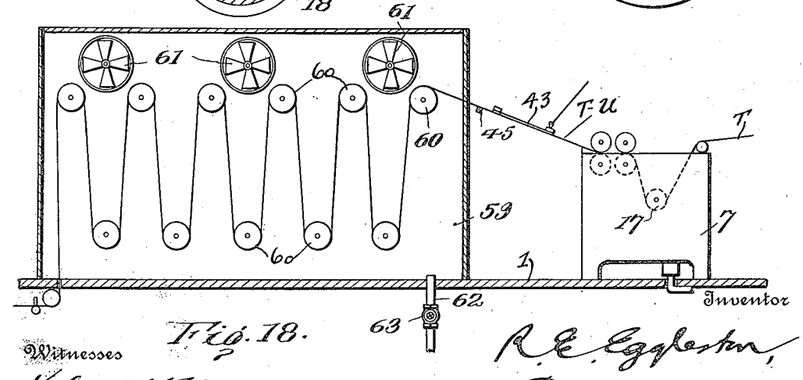
Fig. 18 is a view in vertical section of a modified form of structure, the same, in this instance, contemplating the omission of the heating-rollers illustrated in the embodiment shown in Fig. 1 and substituting therefor a housing into which the tape is to pass and in which it is subjected to the action of heat, a cooling medium, or to air for drying purposes.

As already pointed out, it is not essential to pass the tape around the heating cylinders 47 and 48. In lieu of this, the tape may, for instance, be passed through a different form of drying or heating zone; as, for instance, into a housing 59, in which would be journaled suitable idlers 60, and which will be in adequate number to permit the tape to be retained within the housing a time sufficient to insure its proper drying. If the drying effect of the air within the housing 59 be insufficient, a circulation of air—either hot or cold—may be effected by a series of fans 61. If it be desired to supply a heating or cooling medium to the housing, this may be carried into the same through a pipe 62 controlled by a valve 63— all as shown in Fig. 18. The heating medium may be in the form of hot air, steam, or the like; and the cooling medium may be in the form of cold air brought from a suitable source of refrigeration or the like. In the embodiment already described, the tape is passed through a solution in a tank or similar receptacle. Manifestly, and as already pointed out, the solution may be supplied to the thread without passing the same therethrough: For instance, and as shown in Fig. 11, a solution-containing receptacle 64 may be disposed above the forming roll 17, and be provided with nozzles 65 controlled by a manually-operated, spring-pressed valve 66, which nozzle is adapted to feed the solution onto the threads as the same are passing over the roll 17. Underlying the roll 17, a trough 67 may be provided to catch any solution that may be taken up by the tape, and from which trough leads a drain-pipe 68. In this instance, the threads would preferably be supplied from creels disposed in a plane below the rolls 17 so that the proper forming action of the grooves in said roll would be effected. In this instance, the comb 14 could preferably be used with advantage.

Figure 12:
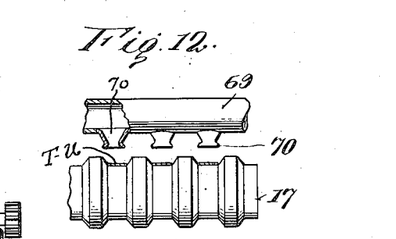

In Fig. 12, I have disclosed another modification of the solution-supplying means: In this instance, no tank is employed; but the solution is brought to the point of use by a pipe 69 provided with nozzles 70 through which the solution may be sprayed or discharged onto the threads while passing over the forming member 17.

Figure 13:
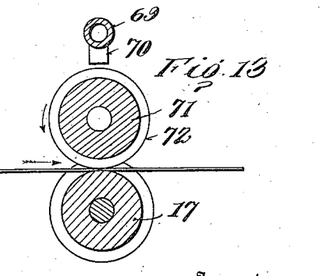
Fig. 13 is still another modification, in end elevation, and partially in section, of another modified form of structure, omitting a solution-supplying tank and including a solution-supplying pipe provided with nozzles adapted to feed the solution upon a rotating feed-roller overlying a tape-forming roller.

In Fig. 13, I have disclosed another modification, wherein the solution is supplied from the pipe 69 through the nozzle 70 onto a rotatable member 71 provided with ribs 72 adapted to carry the solution from the nozzle 70 to the threads as they pass between said roller 71 and the forming member 17.

Figure 14:
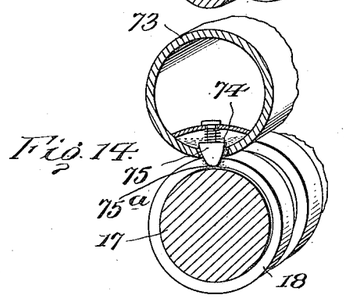
Fig. 14 is a fragmentary view, partially in section, of still another modification which contemplates the omission of a solution-supplying tank and the inclusion of a hollow solution-supplying roller which is rotatable and provided with apertures in its walls controlled by valves adapted to be opened by contacting with the underlying tape-forming roll or member.

In Fig. 14, I have disclosed still another form of solution-supplying means, wherein the same is supplied through a rotatable member 73 which is provided with a series of apertures 74 registering with the grooves 18 in the tape-forming member 17, and which apertures are controlled by a spring-pressed valve 75 supported in a manner to be actuated when the portion 75ª of the valve engages the cylindric surface 19 of the groove of the member 17. By this means, the solution will be supplied to the threads the instant the aperture 74 is in register with the threads bearing on the surface of the forming member 17. In this instance, as in others just described, the solution-holding tank is dispensed with.

Figure 16:
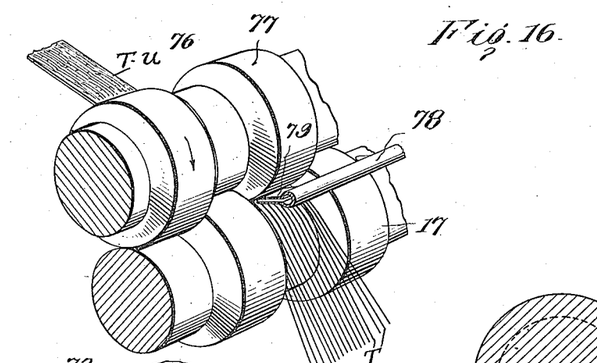
Figure 17:
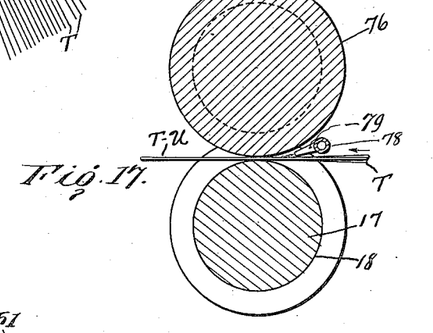

The embodiments of my invention, already described, contemplate one means for passing the threads through the machine, and a distinct means for effecting the laying of the said threads or strands side by side. In the embodiment disclosed in Figs. 15, 16 and 17, I provide a single means for accomplishing these two functions: In this instance, there is disposed above the forming member 17 a roller 76 provided with circumferential ribs or surfaces 77 corresponding with the grooves 18 in the member 17 and adapted to engage the threads as they pass onto the tape-forming member 17 and, by friction, effect a drawing movement on the threads from the creels and a forward movement of the tape. In this instance, the forming member 17 may be rotatable, or held against rotation, as desired. Extending longitudinally of the member 17 and in close relation thereto is a solution-supplying pipe 78 provided with nozzles 79 of a number equal to the grooves in the forming member 17 and through which the solution may be supplied to the threads just before they pass between the tape-employing roller 77 and the forming member 17. It will be seen that the solution is supplied to the threads approximately at the same time that they are being brought together and laid side by side, from which it follows that the two operations of moving the threads and positioning them relatively are accomplished simultaneously and by the combined action of the members 77 and 17, and that the supplying of the solution to the threads is accomplished practically simultaneously with the formation of the tape. For this last construction, I claim distinct advantages. Moreover, in this instance, the compression-rollers, utilized in the other embodiments, may be dispensed with, as the rotatable member 77 may be utilized to accomplish the functions of said compression-rollers.

While I have herein described my invention in detail and exemplified the same in various embodiments, it is to be understood that I do not confine myself thereto nor to the details thereof except in so far as such details may be specified in the claims.

Having thus described my invention, what I claim as new and desire to secure by Letters-Patent is:—

1. Apparatus for producing tape or the like, including in combination, a tank for holding an adhesive solution, means for passing a plurality of threads or strands into said solution in a separated condition, and means disposed within said tank for bodily shifting said threads or strands into contact one with another in the solution, thereby laying them side by side and causing their surfaces to adhere to form a tape.

2. Apparatus for producing tape or the like, including in combination, a tank for holding an adhesive solution, means for passing a plurality of threads or strands into said solution in a separated condition, and means operating in the solution in said holding tank for bodily moving said threads together in the solution and causing their edges to adhere to form tape.

3. Apparatus for producing tape or the like, including in combination, a tank for holding an adhesive solution, means within said tank for effecting a movement of a plurality of initially separated threads or strands toward and against one another in the solution and for causing their edges to adhere to form a tape.

4. Apparatus for producing tape or the like, including in combination, a tank for holding an adhesive solution, means within said tank for effecting a movement of a plurality of initially separated threads or strands toward and against one another in the solution and for causing their edges to adhere to form a tape, a drying instrumentality, and means for passing said tape formed of said plurality of strands in the presence of said drying instrumentality.

5. Apparatus for producing tape or the like, including in combination, means for supplying an adhesive medium, means operative in direct relation to said supplying-means for introducing a plurality of initially separated threads or strands to the binding action of said adhesive medium, and means for effecting a movement of said threads or strands toward and into contact with one another while passing through said medium.

6. Apparatus for producing tape or the like, including in combination, an adhesive solution-supplying instrumentality, and means operating directly in the solution for introducing a plurality of initially separated threads or strands to the binding action of said solution and to effect a movement in the solution of said threads or strands toward and into intimate binding engagement with one another.

7. Apparatus for producing tape and the like, including in combination, a grooved member over which a plurality of initially separated threads are moved, and means for applying an adhesive medium to said threads simultaneously to their bodily movement toward one another and their passing in the grooves of said member.

8. Apparatus for producing tape or the like, including in combination, means for effecting a movement of a plurality of initially separated threads toward and into intimate contact with one another in the solution, and means for supplying an adhesive medium thereto approximately simultaneously with their bodily movement toward one another and their contacting with each other.

9. Apparatus for producing tape or the like, including in combination, a grooved member over which a plurality of initially separated threads are moved and by which said threads are shifted toward and into contact with each other, and means arranged in juxtaposition to said grooved member for supplying adhesive medium to said threads adjacent the point of their bodily movement toward one another and their passing over said grooved member.

10. Apparatus for producing tape or the like, including in combination, a non-rotatable grooved member over which a plurality of threads are moved and by which said threads are shifted toward and into contact with each other, and means arranged in juxtaposition to said grooved member for supplying adhesive medium to said threads adjacent the point of their passing over said grooved member.

11. Apparatus for producing tape or the like, including in combination, a tank for holding an adhesive solution, means for passing a plurality of threads or strands into said solution in a separated condition, means disposed within said tank for bodily shifting said threads or strands into contact one with another in the solution, thereby laying them side by side and causing their surfaces to adhere to form a tape, and pressure-producing instrumentalities disposed adjacent the tank and adapted to press the tape thus formed and effect an intimate union of the strands.

12. Apparatus for producing tape or the like, including in combination, a tank for holding an adhesive solution, means within said tank for effecting a movement of a plurality of initially separated threads or strands toward and against one another in the solution and for causing their edges to adhere to form a tape, a drying instrumentality, means for passing said tape formed of said plurality of strands in the presence of said drying instrumentality, and pressure-producing instrumentalities disposed adjacent the tank and adapted to press the tape thus formed and effect an intimate union of the strands.

13. Apparatus for producing tape or the like, including in combination, a grooved member over which a plurality of initially separated threads are moved and by which said threads are shifted toward and into contact with each other, means arranged in juxtaposition to said grooved member for supplying adhesive medium to said threads adjacent the point of their bodily movement toward one another and their passing over said grooved member, and pressure-producing instrumentalities disposed adjacent the tank and adapted to press the tape thus formed and effect an intimate union of the strands.

14. Apparatus for producing tape or the like, including in combination, a tank for holding an adhesive solution, means for passing a plurality of threads or strands into said solution in a separated condition, means disposed within said tank for bodily shifting said threads or strands into contact one with another in the solution, thereby laying them side by side and causing their surfaces to adhere to form a tape, pressure-producing instrumentalities disposed adjacent the tank and adapted to press the tape thus formed and effect an intimate union of the strands, and a member provided with concaved surfaces to press the thread still closer after passing through said pressure-instrumentalities.

15. Apparatus for producing tape or the like, including in combination, a tank for holding an adhesive solution, means for passing a plurality of threads or strands into said solution in a separated condition, means disposed within said tank for bodily shifting said threads or strands into contact one with another in the solution, thereby laying them side by side and causing their surfaces to adhere to form a tape, pressure-producing instrumentalities disposed adjacent the tank and adapted to press the tape thus formed and effect an intimate union of the strands, a member provided with concaved surfaces to press the threads still closer after passing through said pressure-instrumentalities, and surface-polishing instrumentalities disposed adjacent said member.

16. Apparatus for producing tape or the like, including in combination, a tank for holding an adhesive solution, means for passing a plurality of threads or strands into said solution in a separated condition, means disposed within said tank for bodily shifting said threads or strands into contact one with another in the solution, thereby laying them side by side and causing their surfaces to adhere to form a tape, pressure-producing instrumentalities disposed adjacent the tank and adapted to press the tape thus formed and effect an intimate union of the strands, a member provided with concaved surfaces to press the threads still closer after passing through said pressure-instrumentalities, surface-polishing instrumentalities disposed adjacent said member, and finishing devices adapted to act on the edges of the tape after being subjected to the action of said polishing instrumentalities.

17. Apparatus for producing tape or the like, including in combination, a tank for holding an adhesive solution, means for passing a plurality of threads or strands into said solution in a separated condition, means disposed within said tank for bodily shifting said threads or strands into contact one with another in the solution, thereby laying them side by side and causing their surfaces to adhere to form a tape, pressure-producing instrumentalities disposed adjacent the tank and adapted to press the tape thus formed and effect an intimate union of the strands, a member provided with concaved surfaces to press the threads still closer after passing through said pressure instrumentalities, surface-polishing instrumentalities disposed adjacent said member, finishing-devices adapted to act on the edges of the tape after being subjected to the action of said polishing instrumentalities, and a reel upon which the finished tape is wound.

In testimony whereof I affix my signature in presence of two witnesses.

RUFUS E. EGGLESTON.

Witnesses:
  A. Y. WHITMON,
  M. C. MILES.